(12) United States Patent
Urzua

(10) Patent No.: US 7,438,265 B2
(45) Date of Patent: Oct. 21, 2008

(54) SINGLE AND DOUBLE ELECTRICAL CABLE HOLDER STRIP

(76) Inventor: Luis Berardo Urzua, P.O. Box 814, Neptune, NJ (US) 07753

( * ) Notice: Subject to any disclaimer, the term of this patent is extended or adjusted under 35 U.S.C. 154(b) by 576 days.

(21) Appl. No.: 11/036,244

(22) Filed: Jan. 14, 2005

(65) Prior Publication Data

US 2007/0200034 A1 Aug. 30, 2007

(51) Int. Cl.
*F16L 3/22* (2006.01)
(52) U.S. Cl. .................. 248/74.2; 248/73; 248/68.1
(58) Field of Classification Search .................. 248/65, 248/74.2, 68.1, 73
See application file for complete search history.

(56) References Cited

U.S. PATENT DOCUMENTS 429,421 A * 6/1890 Coit ........................... 248/68.1
887,272 A * 5/1908 Robinson .................... 248/68.1
1,334,545 A * 3/1920 Londelius, Jr. ............. 248/68.1
5,743,497 A * 4/1998 Michael ...................... 248/68.1
D407,963 S * 4/1999 Gretz et al. ................... D8/356

* cited by examiner

*Primary Examiner*—Korie Chan
*Assistant Examiner*—Steven M. Marsh
(74) *Attorney, Agent, or Firm*—Daniel N. Smith

(57) ABSTRACT

The Single and Double Electrical Cable Holder Strip was devised to facilitate a need for efficiency in an industry that continues to increase the amount of cables needed in the modern day buildings. With the advancement of computers and technology, more and more cables are being introduced into buildings than ever before. Today's technicians take an excessive amount of time when dealing with a jumbled mass of cables that need to be unscrambled, located and then replaced, added to and/or repaired. This invention will allow technicians to get in and out of work sites quickly and effortlessly. Most cable and wiring jobs are done with staples and one misplaced staple can ruin the entire line of cable. This cable holder strip solves all of these problems. The benefits to society by using this invention are reduced labor hours, non-staple applications allowing the work to be efficient and well organized.

6 Claims, 1 Drawing Sheet

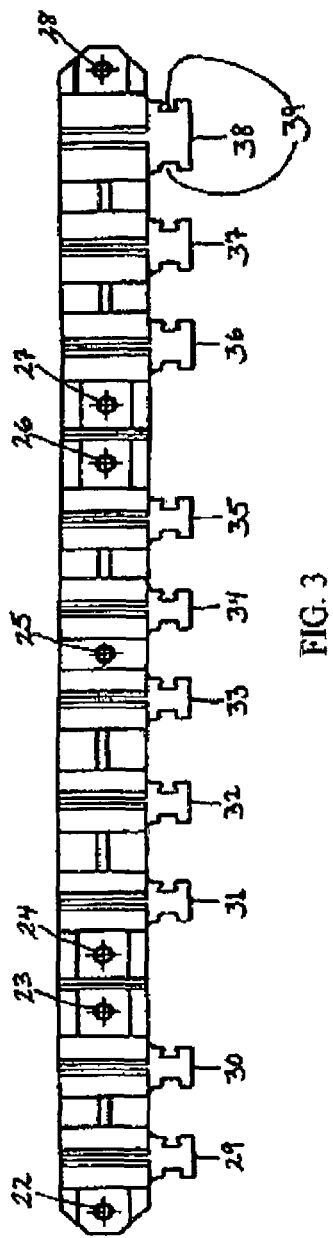
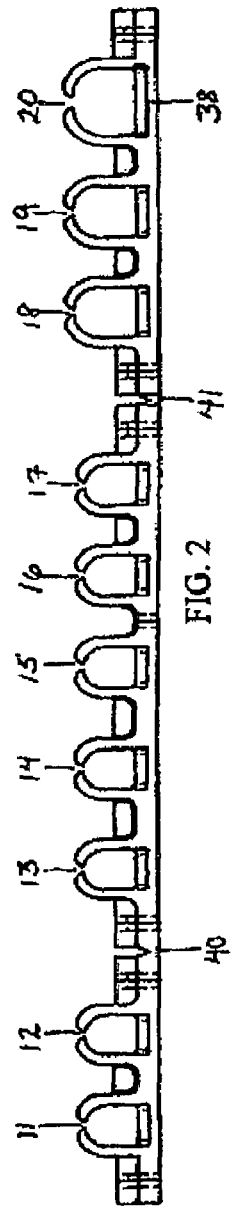
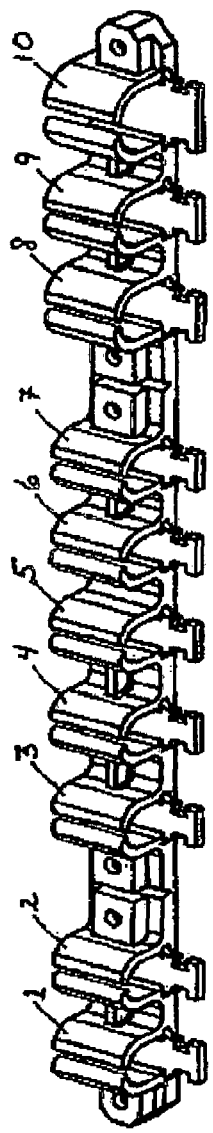
FIG. 3
FIG. 2
FIG. 1

SINGLE AND DOUBLE ELECTRICAL CABLE HOLDER STRIP

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISC APPENDIX

Not Applicable

BACKGROUND OF THE INVENTION

Being in the residential and commercial construction field myself, this invention came out of a need that is not satisfied with any applications done today. I realized there was a need to separate, affix and organize cables in the construction and electrical field. Today's technicians can take many extra hours when dealing with a jumbled mass of wires that need to be unscrambled and then added to or replaced.

Presently, the use of staples is used for affixing cables in attics and 8 inches away from the service box by code. This method can be highly problematic, as staples will sometimes penetrate the cables making them unusable. When this happens, the entire cable or wire must be replaced. Another setback with staples is the limitation to being only used on wood. The use of staples is also a highly time consuming process. Thus, creating unnecessary man-hours to do a task that has a simple solution. My invention came about trying to solve these problems.

BRIEF SUMMARY OF THE INVENTION

The purpose of the Single and Double Electrical Cable Holder Strip is to route, separate, and organize different gauges of cables and wires in the electrical wiring of a house or commercial application to facilitate the installation. This strip can be used to separate cables and wires on rafters, plywood and metal surfaces. Screws, nails or self-tapping screws in the case of metal surfaces will secure the strip. Once the cables are put into the device, they must then be fastened with plastic ties on one side. Cables can be added or replaced easily at anytime by simply cutting the plastic ties on one side of the device. New ties can then be reapplied.

This application will reduce excessive man-hours by making it easy and safe for each individual technician to access their specific area. Through organization, a technician's job is made efficient.

BRIEF DESCRIPTION OF THE SEVERAL VIEWS OF THE DRAWING

FIG. 1 This drawing depicts a perspective view of the single and double electrical cable holder strip invention used for routing, housing and organizing wires and cables in construction and building.

FIG. 2 This is a front view showing the opening of the slots and the sections to be cut and separated.

FIG. 3 This is a plan view of the single and double electrical cable holder strip showing the location of screw holes, tongue and groves.

DETAILED DESCRIPTION OF THE INVENTION

Referring to FIG. 1 the Single and Double Electrical Cable Holder Strip consists of a plastic strip for separating and organizing cables in construction-based applications. The cables are housed at 1 through 10. This product will be made with plastic and manufactured through injection molding. Referring to FIG. 2, the wires and cables are inserted into the edged cable slots indicated at 11 through 20 and then housed in their respective housings. The edgings of the slots allow easy entrance of the cables. The slot openings are large enough to allow cables in, but small enough to temporarily hold them until they are fastened by the plastic ties. Referring to FIG. 2, the tongues as such shown at 29-38 have a space under the tongue that allows plastic ties to be fastened. Thus, permitting the strip to be affixed to a flat surface as opposed to a rafter or joist.

Referring to FIG. 3, the Single and Double Electrical Cable Holder Strip consists of different size housing, small, medium and large. The entire strip can be used as one piece, but it has the option to be separated in three parts. The separation can be made by cutting the thin plastic at 40 and 41 thus, leaving two strips of small housings and one strip of medium and large housings. When separated, each piece can be can be secured by screws or nails at each end.

Referring to FIG. 3 at 22, 23, 24, 25, 26, 27 and 28 the strip can be affixed to any surface such as rafters, plywood and metal. The tongues 29 through 38 are an extended base of the housing, with grooves on the sides of the tongues i.e. as shown at 39. The purpose of the tongues is to allow the cables to be secured with plastic ties at each side. The grooves' purpose is to keep the ties from slipping off.

While there has been shown and described a preferred embodiment of the single and double Electrical cable holder strip of this invention, it is understood that the changes in structure, materials, sizes and shapes can be made by those skilled in the art without departing from the invention. The invention is defined in the following claims.

I claim:

1. A strip device for affixing cables to a flat surface, the strip device comprising: a linear strip structure having a front flat surface and a back flat surface; the linear strip structure further comprises a plurality of channels, wherein each channel comprises a proximal opening on the front flat surface and a distal opening on the back flat surface, wherein the proximal opening allows a means for securing the linear strip structure to a flat surface to pass through the channel to contact the flat surface through the distal opening; the linear strip further comprises a plurality of cable retainers, wherein each cable retainer comprises a first and a second space defining member extending from the front flat surface, wherein the first space defining member further comprises a first arcuate distal end and the second space defining member further comprises a second arcuate distal end, further wherein the first arcuate distal end and the second arcuate distal end curve toward each other but do not contact each other to define a space adapted to hold cables, wherein the space comprises a top opening between the first arcuate distal end and the second arcuate distal end that allows passage of cables into the space; and, the linear strip further comprising a plurality of tongues extending laterally from the front flat surface, wherein each tongue extends between the first and second space defining members of the cable retainer, and wherein each tongue further comprises a first and second groove on opposite sides of the tongue.

2. The strip device of claim 1, wherein the first and second grooves are adapted to receive a tie to secure cables held within the cable retainer on the tongue.

3. The strip device of claim 1, wherein the linear strip structure further comprises a plurality of thin cross sections adapted to allow a user to cut the cross sections and separate the linear strip structure into multiple strip structures.

4. The strip device of claim 1, wherein said strip device is comprised of plastic.

5. The strip device of claim 4, wherein said strip device is comprised of memory plastic.

6. The strip device of claim 1, wherein the means for securing the linear strip structure to a flat surface is selected from the group consisting of nails, screws, staples, tacks and adhesives.

* * * * *